(12) United States Patent
White et al.

(10) Patent No.: US 11,224,167 B2
(45) Date of Patent: Jan. 18, 2022

(54) LOSS CATCH AND RECIRCULATION SYSTEM FOR DRAPER HEAD

(71) Applicant: DEERE & COMPANY, Moline, IL (US)

(72) Inventors: Matthew R. White, Geneseo, IL (US); Daniel S. Hoffman, Bettendorf, IA (US); Corwin M. Puryk, Bettendorf, IA (US); Justin C. Freehill, Fenton, IL (US); Shreyas Modak, Thane (IN); Bryan R. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 198 days.

(21) Appl. No.: 16/689,585

(22) Filed: Nov. 20, 2019

(65) Prior Publication Data

US 2021/0144923 A1    May 20, 2021

(51) Int. Cl.
*A01D 61/02*    (2006.01)
*A01D 61/00*    (2006.01)

(52) U.S. Cl.
CPC .......... *A01D 61/02* (2013.01); *A01D 61/002* (2013.01)

(58) Field of Classification Search
CPC .... A01D 61/02; A01D 61/002; A01D 41/114; A01D 57/20; A01D 34/00; A01D 41/142
See application file for complete search history.

(56) References Cited

U.S. PATENT DOCUMENTS

| 4,303,373 | A | | 12/1981 | Polhemus | |
|---|---|---|---|---|---|
| 4,321,996 | A | * | 3/1982 | Sancken | B65G 21/20 198/499 |
| 4,790,128 | A | * | 12/1988 | Klinner | A01D 41/06 56/364 |
| 5,660,283 | A | * | 8/1997 | Groh | B65G 19/14 198/690.2 |
| 8,752,359 | B2 | * | 6/2014 | Cormier | A01D 41/14 56/156 |
| 2008/0276590 | A1 | * | 11/2008 | Sauerwein | A01D 41/14 56/153 |
| 2009/0277146 | A1 | * | 11/2009 | Sauerwein | A01D 34/13 56/208 |
| 2018/0303034 | A1 | * | 10/2018 | Hasenour | A01D 61/02 |
| 2018/0352743 | A1 | * | 12/2018 | Hasenour | A01D 61/00 |
| 2019/0144209 | A1 | * | 5/2019 | Happe | A01D 57/20 198/810.02 |

FOREIGN PATENT DOCUMENTS

WO    2017005343 A1    1/2017

\* cited by examiner

*Primary Examiner* — Arpad Fabian-Kovacs (57) ABSTRACT

Example draper heads may include an endless belt conveyor and a catch pan disposed adjacent to the endless belt conveyor to collect crop material and defining a uniform gap formed between at least a portion of the catch pan and a portion of an endless belt of the endless belt conveyor located adjacent to the catch pan. A cleat formed on the endless belt cooperates with the catch pan to transport the collected crop material onto the endless belt. The catch pan may include a contoured end that conforms to a shape formed by the endless belt at an end of the endless belt conveyor.

17 Claims, 8 Drawing Sheets

LOSS CATCH AND RECIRCULATION SYSTEM FOR DRAPER HEAD

FIELD OF THE DISCLOSURE

The present disclosure relates generally to draper heads.

BACKGROUND OF THE DISCLOSURE

Agricultural harvesting heads for harvesting non-row crops include draper heads that operate to sever crops using a reciprocating knife. The severed crops fall towards the draper head onto endless belt conveyors. The belt conveyors move laterally from opposing ends of the draper head and towards a central region of the draper head, whereupon the severed crop material is deposited on a central conveyor that carries the crop material rearward into a feederhouse on an agricultural combine that supports the draper head.

SUMMARY OF THE DISCLOSURE

A first aspect of the present disclosure is directed to a draper head for a crop harvester. The draper head may include a frame; a first endless belt conveyor coupled to the frame; a second endless belt conveyor coupled to the frame; and a catch pan. The first endless belt conveyor may include a first endless belt operable to circulate in a first direction. The first endless belt may include a first portion and a second portion located adjacent to the first portion. The first portion and the second portion may be attached to each other to form a continuous strip. The first endless belt conveyor may also include at least one cleat located on the first endless belt and movable with the first endless belt. The first endless belt conveyor may be operable to deposit crop material onto the second endless belt conveyor. The catch pan may include a planar portion extending along a length of the first endless belt and a contoured portion located at an end of the planar portion. The contoured portion may be configured to follow a shape of the second endless belt. The catch pan may be offset from a surface of the second portion of the first endless belt and configured to collect crop material and, in cooperation with the at least one cleat, convey the collected crop material along at least a portion of the catch pan and deposit the collected crop material onto the first portion of the endless belt.

Another aspect of the present disclosure is directed to a draper head for a crop harvester. The draper head may include a frame extending laterally relative to a first direction in which the draper head is moved during a harvesting operation; a first lateral endless belt conveyor coupled to the frame and extending laterally outwardly in a second direction perpendicular to the first direction; a catch pan; a second lateral endless belt conveyor coupled to the frame and extending laterally outwardly in a third direction opposite the second direction; and a central endless belt located between the first lateral endless belt conveyor and the second lateral endless belt conveyor. The first lateral endless belt conveyor may include a plurality of rollers and a first endless belt arranged to encircle the plurality of rollers. The first endless belt may include a first portion extending along a first side of the plurality of rollers; a second portion extending along a second side of the plurality of rollers; and at least one cleat extending from an outer surface of the first endless belt. The first portion and the second portion may combine to form a continuous strip. The catch pan may include a planar portion and a contoured portion. The contoured portion may be configured to follow a contour of the first endless belt at an outboard end of the first endless belt conveyor. The catch pan and the at least one cleat may be configured to cooperate to convey crop material located on the catch pan between the catch pan and the second portion of the first endless belt and deposit the crop material onto the first portion of the first endless belt.

The various aspects may include one or more of the following features. The first endless belt conveyor may also include a first end; a second end opposite the first end; and a plurality of rollers. The first endless belt may be operable to circulate around the plurality of rollers. The first endless belt may conform to a shape one of the rollers at the first end of the first endless belt conveyor. The contoured portion of the catch pan may be configured to follow the shape of the first endless belt at the first end of the first endless belt conveyor. The first endless belt may define a semicircular shape at a first end of the first endless belt conveyor, and the contoured portion of the catch pan may be configured to follow the semicircular shape along an angular range of 90° to 180° of the semicircular shape. The contoured portion of the catch pan may extend along a portion of the first portion of the first endless belt and a portion of the second portion of the first endless belt. The at least on cleat may extend from a surface of the first endless belt, and a gap formed between an end of the at least one cleat and the catch pan may be within a range of 0 millimeters (mm) to 11 mm. The planar portion may extend along an entirety of a width of the first endless belt conveyor and may be parallel with a plane defined by the second portion of the first endless belt. The planar portion may include a first planar portion and a second planar portion angularly offset from the first planar portion. The first planar portion may include an orientation that is parallel with a plane defined by the second portion of the first endless belt, and the second planar portion may be nonparallel with the plane defined by the second portion of the first endless belt. The catch pan further may include at least one rib. The at least one rib may extend from an edge of the catch pan or a position adjacent to the edge of the catch pan and define an oblique angle with respect to the edge of the catch pan. the rib may extend towards the first endless belt. An end of the catch pan opposite the contoured portion may be disposed within a gap formed between the first endless belt conveyor and the second endless belt conveyor.

The various aspects may also include one or more of the following features. The endless belt may define a semicircular shape at the outboard end of the first endless belt conveyor, and the contoured portion of the catch pan may extend between 90° and 180° around the semicircular shape. The catch pan may define a uniform gap between the catch pan and the endless belt for at least a portion of a width of the first endless belt. A first side of the first endless belt conveyor extending in the lateral direction may be located at a first elevation that is less than a second elevation of a second side of the first endless belt conveyor opposite the first side. The catch pan may also include at least one rib extending from a surface of the catch pan adjacent to the first endless belt. The at least one rib may extend towards the first endless belt. A distance between the first side and the second side may define a width of the first endless belt conveyor. The planar portion of the catch pan may also include a first planar portion extending from the first side of the first endless belt conveyor along a first portion of the width of the first endless belt and a second planar portion extending at an angle from the first planar portion along a second portion of the width of the first endless belt conveyor. The second endless portion may diverge from the first endless belt along the second portion of the width of the first endless belt conveyor. The first planar portion may be oriented parallel to a plane defined by the second portion of the first endless belt. The first planar portion and the second portion of the first endless belt may define a uniform gap formed between the first planar portion and the second portion of the first endless belt. The first planar portion may include a plurality of ribs extending towards the first endless belt, the plurality of ribs extending from position adjacent to a first edge corresponding to the first side of the first endless belt conveyor towards the outboard end of the first endless belt conveyor. An inboard end of the first lateral endless belt conveyor may overlap a portion of the central endless belt conveyor to define a gap, and an inboard end of the catch pan may be located within the gap.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. It is fully contemplated that the features, components, and/or steps described with respect to one implementation may be combined with the features, components, and/or steps described with respect to other implementations of the present disclosure.

During crop harvesting using a draper head, a portion of the crop harvest is lost to the ground. For example, a portion of the severed crop material falls from the draper head to the ground as a result, for example, of crop adherence to the feeder belts or due to vibration during harvest. Crop material that adheres to the lateral feeder belts falls to the ground as a portion of the belt to which the crop material is adhered is located adjacent to the ground. A portion of the crop material may also be lost in transferring the crop material from one conveyor to another, such as from a lateral belt conveyor to a central belt conveyor. In order to reduce or eliminate this crop material loss and increase crop yield, the present disclosure describes improved draper heads having crop material retention and collection features.

Figure 1:
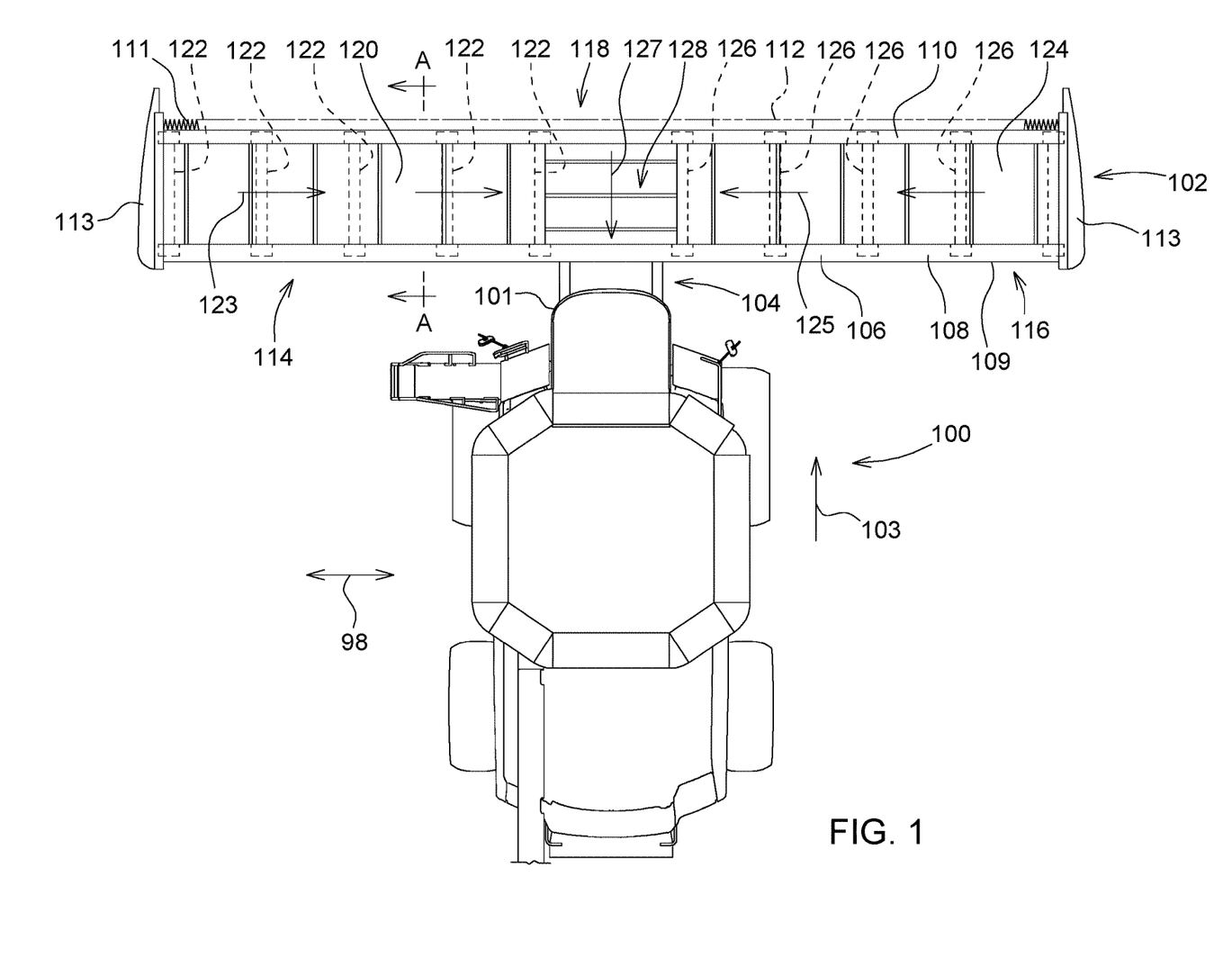
FIG. 1 is a plan view of a crop harvester that includes a draper head, according to some implementations of the present disclosure.

FIG. 1 is a top view of an example agricultural harvester 100. In the illustrated example, the agricultural harvester 100 is in the form of a combine harvester. However, the scope of the disclosure is not so limited, and other types of harvesters are intended to be encompassed by the present disclosure. The agricultural harvester 100 supports a row independent harvesting head, which is in the form of a draper head 102. The draper head 102 is supported on a feederhouse 104. The feederhouse 104 is coupled to and extends from an end 101 of the agricultural harvester 100. The end 101 defines a front end of the agricultural harvester 100 during the course of harvesting when the agricultural harvester 100 is being propelled in the direction of arrow 103. That is, during harvesting of crops, the agricultural harvester 100 travels in the direction of arrow 103.

The draper head 102 includes a frame 106 that extends laterally in the direction of double-sided arrow 98 and perpendicular to the direction of arrow 103. Thus, the arrow 98 represents lateral directions of the agricultural harvester 100, and the arrow 103 represents a longitudinal direction of the agricultural harvester 100. The frame 106 includes a first transverse beam 108 disposed at a first end 109 of the frame 106 and a second transverse beam 110 disposed at a second end 111 of the frame 106, opposite the first end 109. Excluding side covers 113, each of the beams 108 and 110 extends an entire width of the draper head 102. The draper head 102 also include a reciprocating knife 112 located along and extending from the second end 111 of the frame 106. Again, excluding the side covers 113, the reciprocating knife 112 extends along the entire width of the draper head 102.

The draper head 102 also includes a first lateral endless belt conveyor 114, a second lateral endless belt conveyor 116, and a center endless belt conveyor 118. The first and second lateral endless belt conveyors 114 and 116 operate to convey severed crop material in a lateral direction towards the center endless belt conveyor 118. The first lateral endless belt conveyor 114 includes an endless belt 120 and a plurality of rollers 122 about which the endless belt 120 circulates. At least one of the rollers 122 is driven, such as by a motor or other motive device, to cause the endless belt 120 to travel in a direction of arrow 123 such that severed crop material resting on the endless belt 120 is conveyed inwardly toward the center endless belt conveyor 118. The second lateral endless belt conveyor 116 includes an endless belt 124 and a plurality of rollers 126 about which the endless belt 124 circulates. At least one of the rollers 126 is driven, such as by a motor or other motive device, to cause the endless belt 124 to travel in a direction of arrow 125 such that severed crop material resting on the endless belt 124 is conveyed inwardly toward the center endless belt conveyor 118.

Although the first and second lateral endless belt conveyors 114 and 116 are shown as including a single endless belt, i.e., endless belts 120 and 124, respectively, the present disclosure encompasses lateral endless belt conveyors having multiple endless belts. For example, lateral endless belt conveyors including two or more endless belts are within the scope of the present disclosure, and the features described with respect to an endless belt of a lateral endless belt conveyor having a single endless belt are applicable to all of the endless belts of a multi-belt lateral endless belt conveyor. Further, one or more features of an endless belt may be applied to one or more of the endless belts of a multi-belt lateral endless belt conveyor while one or more of the features may be omitted form one or more other of the endless belts. Thus, although the implementations described herein are made in the context of lateral endless belt conveyors having a single endless belt, lateral endless belt conveyors having multiple endless belts are also within the scope of the present disclosure.

The center endless belt conveyor 118 includes an endless belt 128 that is supported on rollers (not shown) for circulating movement such that severed crop material resting on the endless belt 128 is moved in the direction of arrow 127.

Figure 2:
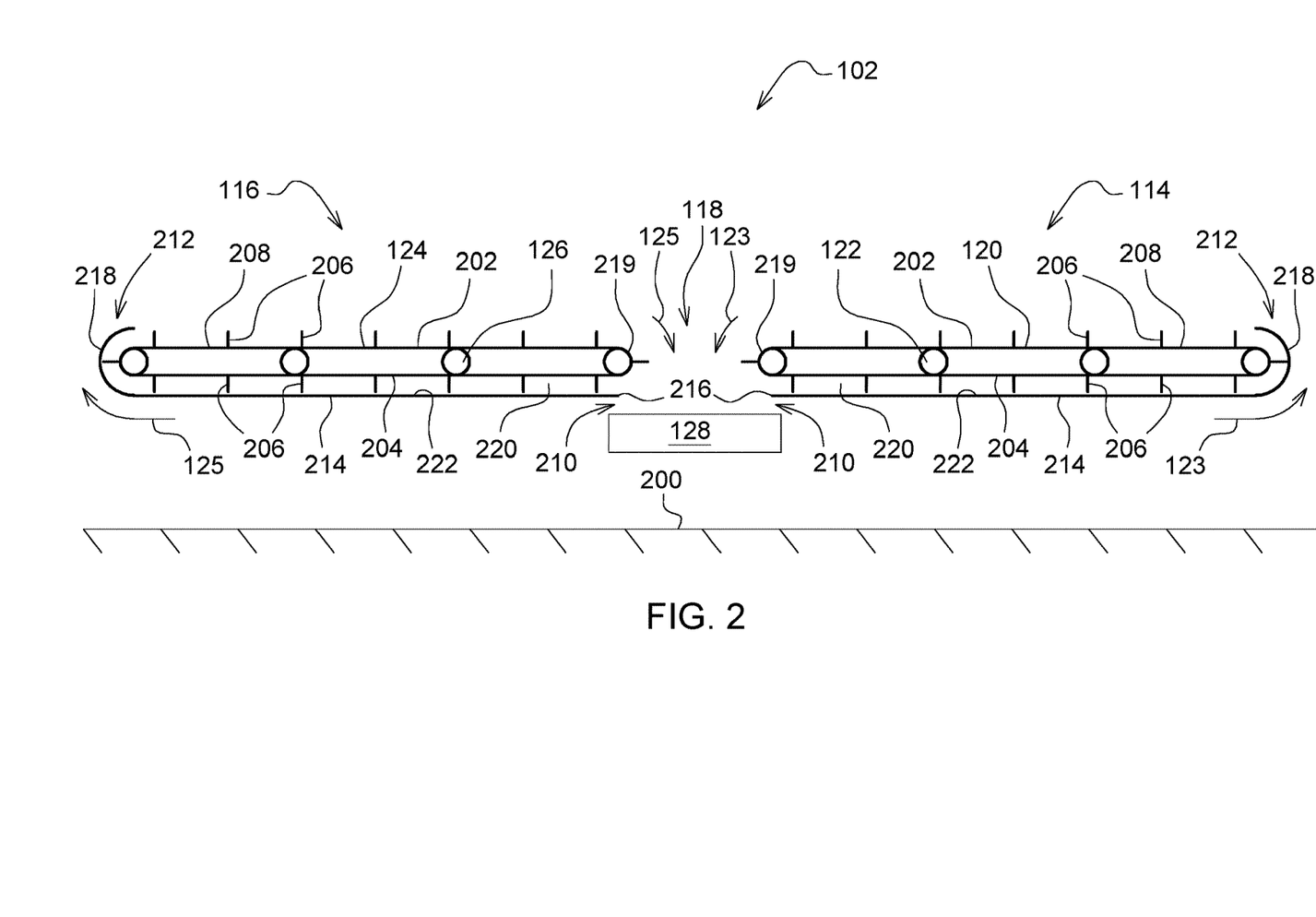
FIG. 2 is a partial schematic view of a draper head showing first and second lateral endless belt conveyors and a center endless belt conveyor, according to some implementations of the present disclosure.

FIG. 2 is a partial schematic view of a front end of the draper head 102 of FIG. 1. FIG. 2 shows the first and second lateral endless belt conveyors 114 and 116 and the center endless belt conveyor 118. FIG. 2 illustrates an orientation of the draper head 102 as the draper head 102 would normally be oriented during normal operation on level ground 200. The illustrated orientation is used to describe the relative orientation of the components of the draper head 102 shown in FIG. 2 (e.g., top or bottom or left or right) with the understanding that such positional designations may be different with the draper head 102 having an orientation different than the one illustrated in FIG. 2.

FIG. 2 shows a front end of the draper head 102, as would be seen if viewed from a position adjacent to the second end 111 and in a direction of arrow 127, as shown in FIG. 1. As shown in FIG. 2, each of the endless belts 120 and 124 include a top portion 202 and a bottom portion 204. The top portions 202 are separated from the bottom portions 204 by the rollers 122 and 126, respectively. During operation, severed crop material is deposited on the top portions 202 of the endless belts 120 and 124. The endless belt 120 rotates in the direction of arrow 123, and the endless belt 124 rotates in the direction of arrow 125. Each of the endless belts 120 and 124 include a plurality of cleats 206 formed on an exterior surface 208 of the endless belts 120 and 124. The cleats 206 operate to assist in conveying severed crop material deposited on the top portions 202 of the endless belts 120 and 124.

In operation, the endless belts 120 and 124 rotate in the respective directions 123 and 125. As a result, severed crop material deposited on the top portions 202 of the endless belts 120 and 124 is conveyed to the center endless belt conveyor 118, where the endless belt 128 conveys the severed crop material to the feederhouse 104, shown in FIG. 1.

However, for conventional draper heads, a portion of the severed crop material is lost to the ground 200 through, for example, gaps 210 between inboard ends 219 of the endless belts 120 and 124 and the central endless conveyor 118. Crop loss also occurs at outboard ends 212 of the endless belt conveyors 114 and 116. Crop loss also occurs due to temporary adhesion of crop material to the endless belts 120 and 124. At least a portion of the adhered crop material releases from the endless belts 120 and 124 as the crop material travels laterally outwards in the direction of the outboard ends 212 and adjacent to the ground 200. Draper heads within the scope of the present disclosure avoid this loss by recapturing all or a portion of this crop loss with the use of catch pans 214. In the context of FIG. 2, the catch pans 214 are located below the endless belts 120 and 124 to collect crop material separated from or around the endless belts 120 and 124 and otherwise lost to the ground 200. Crop material collects on collecting surfaces 222 of the catch pans 214.

The catch pans 214 are positioned on the draper head 102 such that one of the catch pans 214 is disposed below each of the endless belts 120 and 124. The catch pans 214 include inboard ends 216 and outboard ends 218. In some implementations, the inboard ends 216 terminate in the gaps 210 formed between the respective endless belts 120 and 124 and the endless belt 128 to capture crop material that may otherwise be lost to the ground as the crop material transitions from the endless belts 120 and 124 to the endless belt 128 of the center endless belt conveyor 118. In some implementations, the outboard ends 218 are contoured to follow a curved shape of the endless belts 120 and 124 as the belts conform to outermost rollers 122 and 126, respectively. Thus, in some implementations, the outboard ends conform to a semicircular shape of the endless belts 120 and 124 at the outboard ends 212 of the endless belt conveyors 114 and 116, respectively. The contoured outboard ends 218 operate, for example, to convey crop material captured by the catch pan 214 to the top portion 202 of the endless belts 120 and 124.

The catch pans 214 and the cleats 206 cooperate to transport captured crop material collected on the catch pan 214. As a result of the direction of rotation of the endless belts 120 and 124, the captured crop material is transported to the contoured outboard ends 218 of the catch pans 214 where the cleats cooperate with the contoured outboard ends 218 to lift and deposit the collected crop material onto the top portion 202 of the endless belts 120 and 124.

In some implementations, the catch pans 214 and the rollers 122 and 126 are coupled to common structure of the draper head 102, such as the frame 106, such that relative movement between the catch pans 214 and the first and second lateral endless belt conveyors 114 and 116 is minimized or eliminated. By minimizing or eliminating relative movement between the endless belts 120 and 124 and the respective catch pans 214, a gap 220 formed between the endless belts 120 and 124 and the respective catch pans 214 remains constant. The constant gap size accepts cleats having a constant height to pass therealong and move collected crop material along the catch pan 214.

Figure 3:
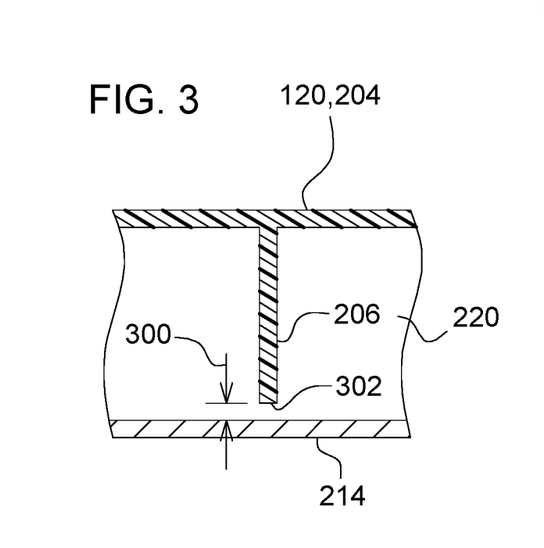
FIG. 3 is a detail view showing a portion of a bottom portion of an endless belt and a catch pan located adjacent thereto, according to some implementations of the present disclosure.

FIG. 3 is a detail view showing a portion of the bottom portion 204 of the endless belt 120 and the catch pan 214 located adjacent thereto. A cleat 206 of the endless belt 120 is also shown extending towards the catch pan 214. In some implementations, a gap 300 may be formed between an end 302 of the cleat 206 and the catch pan 214. In some implementations, the gap 300 may be within a range of 0 millimeters (mm) to 11 mm. More particularly, the gap 300 may be 0 mm, 1 mm, 2 mm, 3 mm, 4 mm, 5 mm, 6 mm, 7 mm, 8 mm, 9 mm, 10 mm, or 11 mm. The gap 300 may have a gap greater than 0 mm in order to avoid excess wear of the cleats 206 and, thus, extend a life of the endless belts 120 and 124. For example, a size of the gap 300 may depend upon the crop being harvested. Thus, the size of the gap 300 may vary with crop type and, in some implementations, the gap 300 may have a size greater than 11 mm.

During operation, the gap 300 may vary as a result of vibration as the agricultural harvester carrying the draper head, such as agricultural combine 100, moves over the ground. Thus, a gap 300 that is greater than zero may be desirable. On the other hand, a gap 300 greater than a particular amount may reduce an overall effectiveness of the cooperation between the cleats 206 and the catch pans 214 or render recovery of the crop material collected by the catch pans 214 ineffective. For example, if the gap 300 exceeds a particular amount, the cleats 206 may be unable to effectively engage and transport the crop material deposited on the catch pans 214. As a result, the gap 300 is selected to enable effective engagement between the cleats 206 and the collected crop material located on the catch pans 214 and transportation of the collected crop material along the catch pans 214 for deposition of the crop material onto the top portion 202 of the endless belts 120 and 124 at the outboard ends 212 of the endless belt conveyors 114 and 116, respectively.

Figure 4:
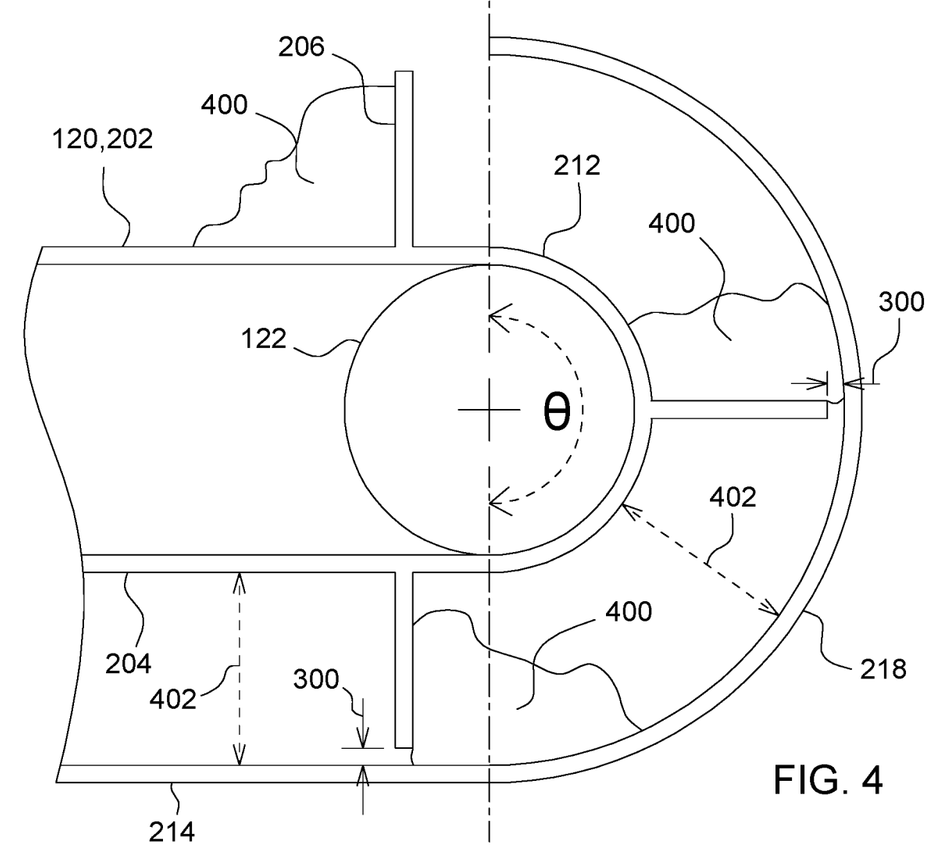
FIG. 4 is a detail view of an end of an example endless belt conveyor, according to some implementations of the present disclosure.

In some implementations, the gap 300 remains constant between the cleats 206 and the catch pans 214 for at least a portion of the width of the endless belts 120 and 124. Further, the gap 300 remains constant between the cleats 206 and the catch pans 214, including along the contoured outboard ends 218 of the catch pans 214. FIG. 4 shows a detail view of the outboard end 212 of the endless belt conveyor 114. At the outboard end 212, the endless belt 120 conforms to the roller 122 to define a semicircular shape. FIG. 4 shows that gap 300 remains constant along the contoured outboard end 218 of the catch pan 214. As also shown, the contoured end 218 of the catch pan 214 extends about the semicircular shape of the outboard end 212 of the endless belt conveyor 114 for an angle $\theta$ of 180°. In other implementations, the angle $\theta$ may be different. For example, in some implementations, the angle $\theta$ may be 90°. In some implementations, the angle $\theta$ may be between 90° and 180°. For example, in some implementations, the angle $\theta$ may be 90°, 95°, 100°, 105°, 110°, 115°, 120°, 125°, 130°, 135°, 140°, 145°, 150°, 155°, 160°, 165°, 170°, 175°, 180°, or any angle in-between. Again, cooperation between the cleats 206 and the catch pans 214, including along the contoured outboard end 218, results in transportation and deposition of crop material 400 collected on the catch pan 214 onto the top portions 202 of the endless belts 120 and 124.

However, in other implementations, the endless belt 120 may define other shapes at the outboard end of the endless belt conveyor 114 that are not semicircular. In other implementations, the outboard end 218 of the catch pan 214 may conform to the shape of the endless belt 120 along the outboard end 212 of the endless belt conveyor 114. The outboard end 218 of the catch pan 214 may define a uniform gap 402 between the endless belt 120 and the outboard end 218 of the catch pan 214 at the outboard end 212 of the endless belt conveyor 114.

Figure 5:
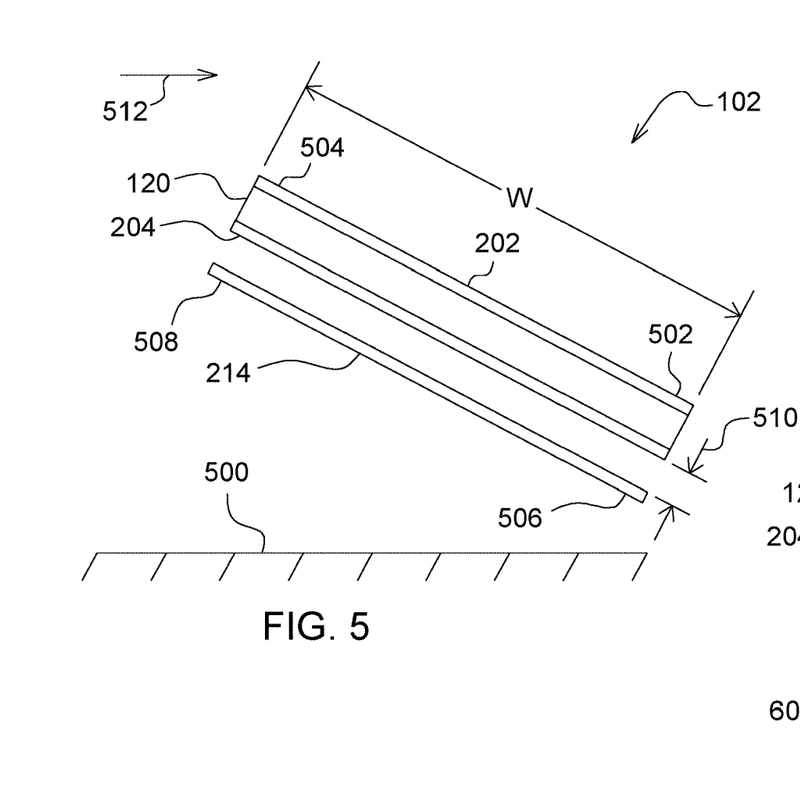
FIGS. 5 and 6 are transverse cross-sectional views of example draper heads, according to some implementations of the present disclosure.
Figure 6:
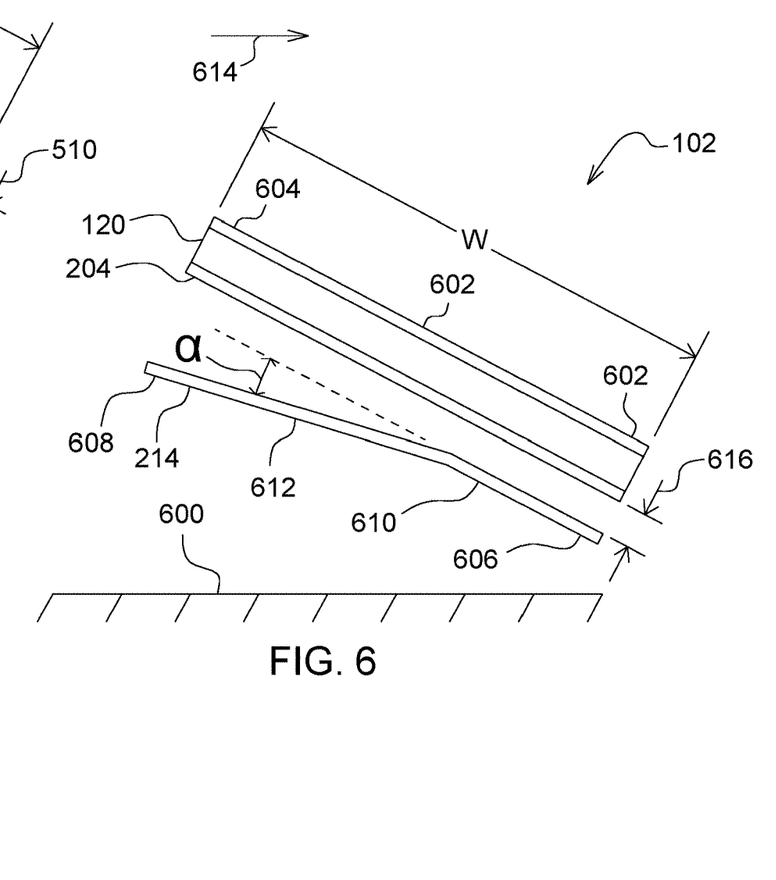

FIGS. 5 and 6 show transverse cross-sectional views of different implementations of the draper head 102 in which some of the components of the draper head 102 are shown. The cross-sectional views shown in FIGS. 5 and 6 are taken along line A-A, shown in FIG. 1. Although the cross-sectional views of FIGS. 5 and 6 show an orientation of the endless belt 120 and associated catch pan 214, the endless belt 124 and associated catch pan 214 may be configured similarly.

As shown in both FIGS. 5 and 6, the agricultural harvester to which the draper head 102 is connected is on level ground and the draper head 102 is in a crop harvesting configuration. In such a configuration and referring to FIG. 5, the endless belt 120 is angled relative to the ground 500 such that a leading end 502 is positioned closer to the ground 500 than a trailing end 504. As shown in FIG. 5, the catch pan 214 has a leading edge 506 and a trailing edge 508 is parallel to the bottom portion 204 of the endless belt 120 (or a plane defined by the bottom portion 204 of the endless belt 120) along an entire width W of the endless belt 120. In such a configuration, a gap 510 formed between the endless belt 120, e.g., along the lower portion 204 of the endless belt 120, and the catch pan 214 is constant across the entire width W of the endless belt. As a result, cleats (not shown in FIG. 5 but which may be similar to cleats 206 described earlier) formed on the endless belt 120 and extending a constant distance from the endless belt 120 define an end surface (corresponding to end 320 shown in FIG. 3) that is also parallel to the catch pan 214. Thus, an entirety of such cleats is operable to transport crop material deposited on the catch pan 214 and deposit the crop material onto the top portion 202 of the endless belt 120. Arrow 512 illustrates a direction of travel of the draper head 102 when the draper head 102 is being used to harvest crops.

FIG. 6 shows another example arrangement of the endless belt 120 and the associated catch pan 214. Again, the endless belt 120 is angled relative to the ground 600 such that a leading end 602 of the endless belt 120 is closer to the ground 600 than a trailing edge 604. The catch pan 214 includes a leading edge 606 and a trailing edge 608. In this example, the catch pan 214 includes a first portion 610 that extends parallel to the endless belt 120 (e.g., the lower portion 204 or a plane defined by the lower portion 204) along a portion of the width W thereof and a second portion 612 that forms an oblique angle $\alpha$ relative to the endless belt 120 in the longitudinal direction (i.e., in the direction of arrow 103 in FIG. 1.). Arrow 614 indicates a direction of travel of the draper head 102 when the draper head 102 is being used to harvest crops.

A gap 616 is formed between the first portion 610 of the catch pan 214 and the lower portion 204 of the endless belt 120. The gap 616 is constant across an entirety of the first portion 610 of the catch pan 214. A distance between the second portion 612 of the catch pan 214 and the lower portion 204 of the endless belt 120 varies. In the illustrated example, the second portion 608 of the catch pan 214 is planar. In other implementations, the second portion 608 of the catch pan 214 may have other shapes. In still other implementations, the catch pan 214 may have more than two portions in which two or more portions of the catch pan 214 may be parallel with the endless belt 120 and one or more other portions that are not parallel with the endless belt 120.

In the example shown in FIG. 6, the endless belt 120 may include cleats, which may be similar to cleats 206, that extend a uniform distance from a surface of the endless belt 120, are effective in transporting crop material deposited on the catch pan 214 along the catch pan 214 and onto the top portion 202 of the endless belt 214. However, a portion of the such cleats extending along the width W of the endless belt 120 beyond the first portion 610 and adjacent to the second portion 608 may have a diminished capability of transporting crop material collected on the second portion 608 of the catch pan 214. However, as shown, the second portion 608 of the catch pan 214 is angled relative to the level ground 600. Consequently, gravity and vibration resulting from crop harvesting and operation of the draper head operate to move crop material collected on the second portion 608 onto the first portion 610 where the cleats are effective in transporting the collected crop material.

Figure 7:
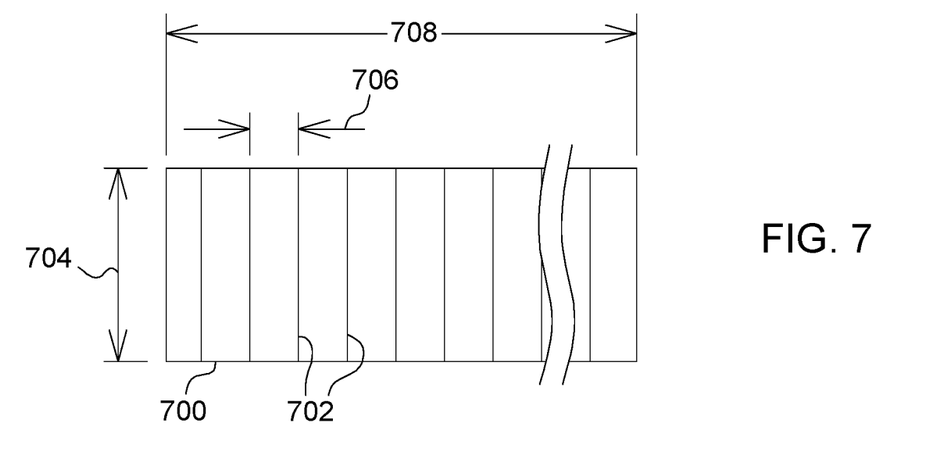
FIGS. 7, 8, and 9 are top views of example endless belts having example arrangements of cleats formed respectively thereon, according to some implementations of the present disclosure.

FIGS. 7, 8, and 9 show example arrangements of cleats extending from example endless belts within the scope of the present disclosure. In FIG. 7, the endless belt 700 includes a plurality of cleats 702 that extend across an entire width 704 of the endless belt 700. As shown in FIG. 7, the cleats 702 are uniformly arranged on the endless belt 700 such that a distance 706 between adjacent cleats 702 is constant. However, in other implementations, a distance separating adjacent cleats 702 may vary along a length 708 of the endless belt 700.

Figure 8:
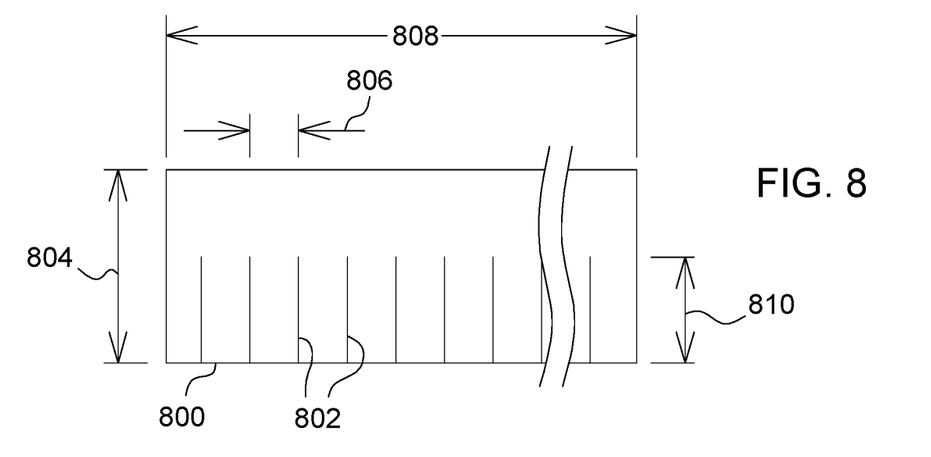

FIG. 8 shows another example implementation of an endless belt 800 in which cleats 802 extend over less than an entirety of a width 804 of the endless belt 800. In some implementations, an amount by which the cleats 802 extend over the width 804 of the endless belt 800 corresponds to a span of a first portion of the catch pan, e.g., the first portion 610 of catch pan 214 shown in FIG. 6, extending across the width 804 of the endless belt 800. Cleats 802 with spans that correspond to such a first portion of a catch pan may be used since a portion of a cleat that may otherwise extend over a second portion of the catch pan 214, such as a portion similar to the second portion 608 shown in FIG. 6, may have diminished effectiveness in transporting crop material as a result of the angular relationship relative to the endless belt 800. In the illustrated example, the cleats 802 extend across a portion 810 of the width 804 of the endless belt 800. The cleats 802 are uniformly arranged on the endless belt 800 such that a distance 806 between adjacent cleats 802 is constant. However, in other implementations, a distance separating adjacent cleats 802 may vary along a length 808 of the endless belt 800.

Figure 9:
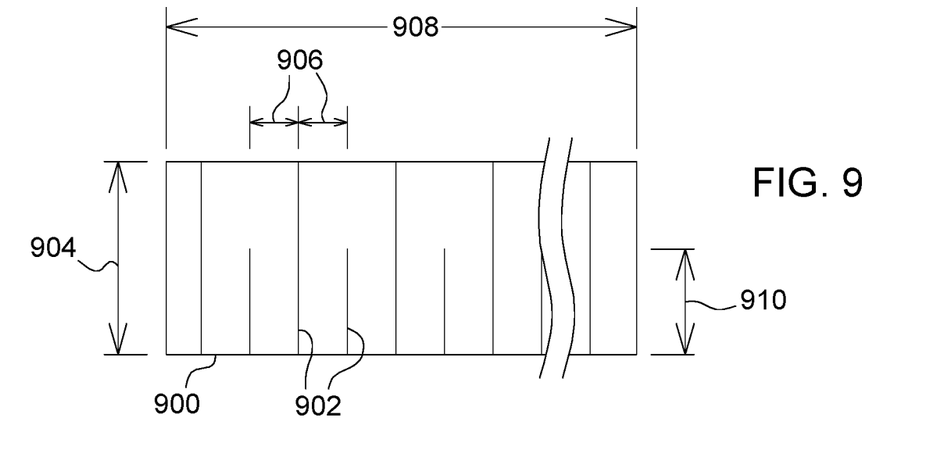

FIG. 9 shows another endless belt 900. Cleats 902 formed on the endless belt 900 have varying lengths. Some of the ribs 902 extend across a portion 910 of a width 904 of the endless belt 900 while other cleats 902 extend across an entity of the width 904 of the endless belt 900. FIG. 9 shows cleats of two different lengths. In other implementations, a variety of cleats 902 having a variety of different lengths may be included on the endless belt 900. Further, the cleats 902 are shown as being uniformly arranged on the endless belt 900 such that a distance 906 between adjacent cleats 802 is constant. However, in other implementations, a distance separating adjacent cleats 902 may vary along a length 908 of the endless belt 900.

Figure 10:
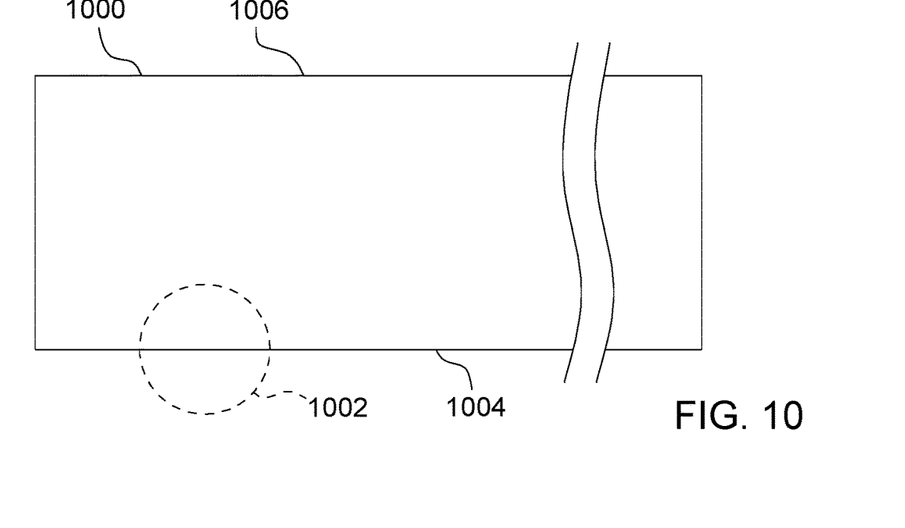
FIG. 10 is a top view of another example endless belt, according to some implementations of the present disclosure.
Figure 11:
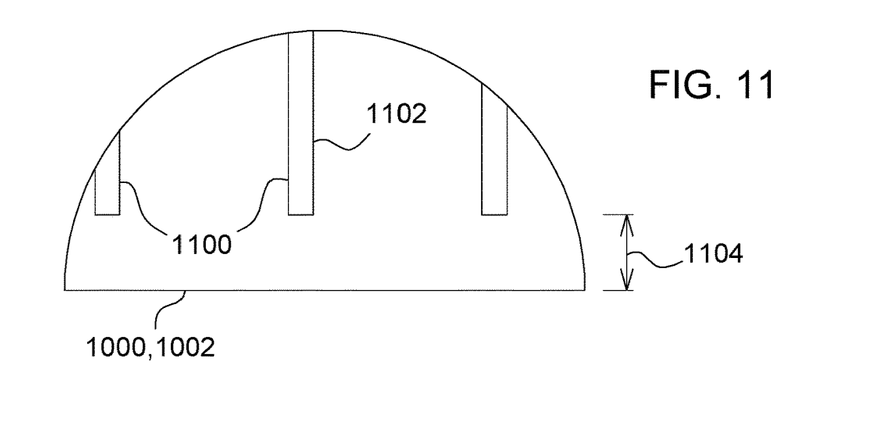
FIG. 11 is a detail view of a portion of the example endless belt of FIG. 10, according to some implementations of the present disclosure.
Figure 12:
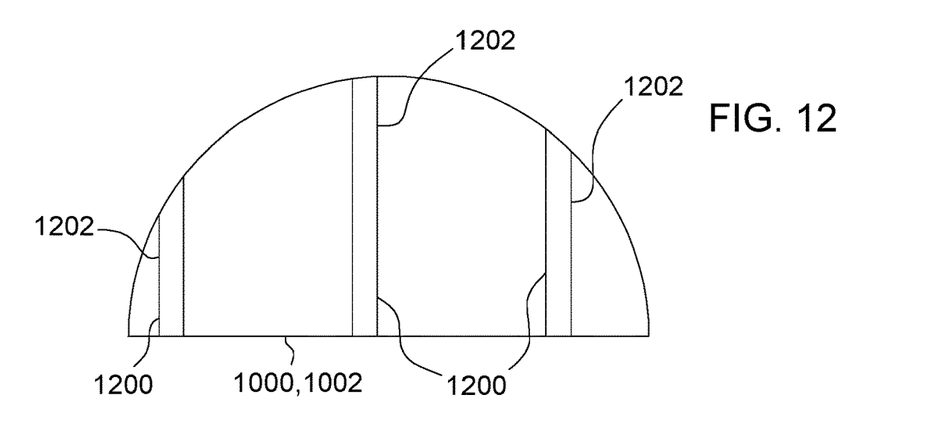
FIG. 12 is another detail view of a portion of the example endless belt of FIG. 10, according to some implementations of the present disclosure.

FIG. 10 shows another example endless belt 1000, and FIGS. 11 and 12 are detail views of an edge 1002 of the endless belt 1000 taken at 1004 in FIG. 10. In the example implementation shown in FIG. 11, ends 1100 of cleats 1102 are offset from the edge 1002 of the endless belt 1000 by a distance 1104. Although FIG. 11 illustrates that all of the cleats 1102 include an end 1100 that is offset from the edge 1002 of the endless belt 1000, in other implementations, one or more of the cleats 1102 may extend to the edge 1002 of the endless belt 1000. In some implementations, ends of the cleats 1102 opposite the ends 1100 may be offset from an edge 1006 of the endless belt 1000 by a distance, which may be the same or different than the distance 1104. As shown in FIG. 12, in other implementations, ends 1200 of the cleats 1202 extend to the edge 1004 of the endless belt 1000. Similarly, ends of the cleats 1202 opposite the ends 1200 may extend to the edge 1006 of the endless belt 1000. Further, although FIGS. 7-12 show cleats having orientations in which the cleats extend perpendicularly to the edges of the endless belts, in other implementations, one or more of the cleats may define an oblique angle relative to one or both edges of the endless belts.

Figure 13:
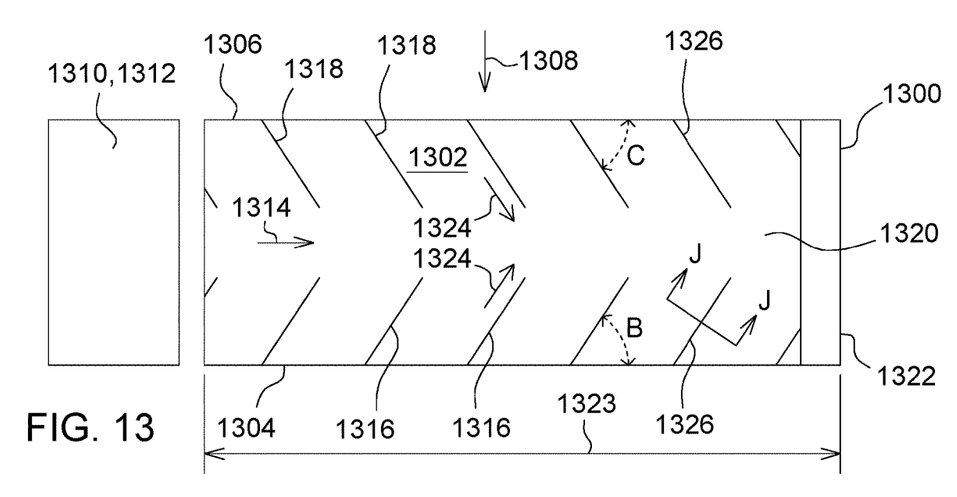
FIG. 13 is a top view of an example catch pan, according to some implementations of the present disclosure.

FIG. 13 is a top view of an example catch pan 1300. The catch pan 1300 may have a position on a draper head similar to that of the catch pan 214, as shown in FIG. 2. Thus, the catch pan 1300 may be located adjacent to an endless belt conveyor in a manner similar to the manner in which the catch pan 214 is positioned relative to the endless belt conveyor 114. The catch pan 1300 includes a collecting surface 1302, which corresponds to collecting surface 222 shown in FIG. 2, a leading edge 1304, and a trailing edge 1306. Arrow 1308 indicates a direction of travel of the catch pan 1300 (and associated draper head) during a crop harvesting operation. A location of an endless belt 1310 of a center endless belt conveyor 1312 is shown, schematically, adjacent to the catch pan 1300. Arrow 1314 indicates a direction of movement of a cleat of an adjacent endless belt of a lateral endless belt conveyor, which may be similar to lateral endless belt conveyor 114, relative to the collecting surface 1302 as well as a general direction of movement of collected crop material along the collecting surface 1302. Another catch pan similar to catch pan 1300 may be provided on a side of the endless belt conveyor 1312, opposite the catch pan 1300. Thus, the additional catch pan may have a position on a draper head similar to the catch pan 214 adjacent to the endless belt conveyor 116, as shown in FIG. 2. This additional catch pan may be configured to be a mirror image of the catch pan 1300 as reflected from the centerline of the endless belt conveyor 1312. Configurations of the catch pan 1300 and, thus, the additional catch pan, are described in more detail below.

Figure 19:
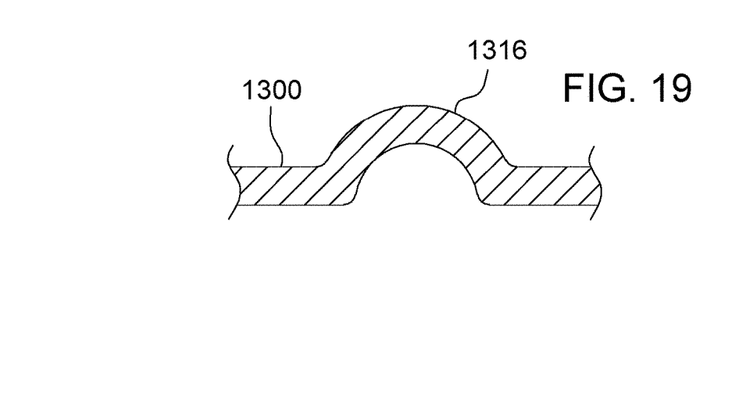
FIGS. 19 and 20 are cross-sectional views of example ribs formed in a catch pan, according to some implementations of the present disclosure.
Figure 20:
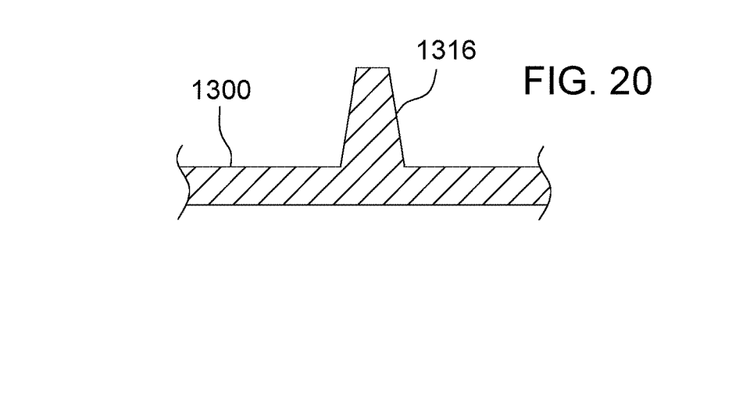

The catch pan 1300 includes a first set of ribs 1316 and a second set of ribs 1318. The ribs 1316 and 1318 may be formed in the catch pan 1300 or otherwise attached to the catch pan 1300. For example, in some implementations, one or more of the ribs 1316 and 1318 may be formed as raised indentations formed in the catch pan 1300. For example, FIG. 19 is a cross-sectional view of a portion of the catch pan 1300 taken along line J-J in FIG. 13. The rib 1316 defines an elongated indentation formed in the catch pan 1300. In other implementations, one or more of the ribs 1316 and 1318 may be formed from components that are attached to the collecting surface 1302, such as by welding, adhesive, fastener, or other joining method or implement. FIG. 20 is a cross-sectional view of the catch pan 1300 taken along line J-J in which the rib 1316 is in the form of a strip of material added to or formed on the catch pan 1300. The ribs 1316 shown in FIGS. 19 and 20 are oriented such that the ribs 1316 extend towards an endless belt located adjacent thereto.

As shown in FIG. 13, the first set of ribs 1316 extends from the leading edge 1304 towards a central portion 1320 of the catch pan 1300. A second set of ribs 1318 extend from the trailing edge 1306 towards the central portion 1320. The ribs 1316 are angled relative to the leading edge 1304 and extend toward an outboard end 1322 of the catch pan 1300. The ribs 1316 form an angle B with the leading edge 1304. Similarly, the ribs 1318 form an angle C relative to the trailing edge 1306 and extend towards the outboard end 1322. In some implementations, angles B and C may be within a range of 10° to 70°. For example, the angles B and C may be 10°, 15°, 20°, 25°, 30°, 35°, 40°, 45°, 50°, 55°, 60°, 65°, or 70°. In some implementations, the angles B and C may be less than 10°. In other implementations, the angles B and C may be greater than 70°. Further, in some implementations, the angles B and C may be the same. In other implementations, the angles B and C may be different. Further, in some implementations, the angles B and C may vary along a length 1323 of the catch pan 1300. For example, one or both of the angles B and C may have a smaller angle at an inboard position (i.e., at a position near the center endless belt conveyor 1312) and larger towards an outboard position (i.e., near the outboard end 1322). Alternatively, in other implementations, one or both of the angles B and C may decrease along the length 1323 of the catch pan 1300. Thus, one or both of the angles B and C may have a larger angle at a more inboard position and a smaller angle at a more outboard position. In some implementations, one or more of the ribs 1600 and 1800 may be curved so as to define a curved path along the collecting surface 1302 of the catch pan 1300.

The ribs 1316 and 1318 cooperate with the cleats of an adjacent endless belt to move collected crop material towards the central portion 1320 in indicated by arrows 1324. Although the ribs 1316 and 1318 are shown as extending to the respective leading and trailing edges 1304 and 1306, in other implementations, one or more of the ribs 1316 and 1318 may be offset from leading edge 1304 or trailing edge 1306. Thus, in some implementations, a gap may exist between ends 1326 of one or more of the ribs 1316 and 1318 and the respective leading or trailing edges 1304 and 1306. Still further, a length of the ribs 1316 and 1316 may vary along the length 1323 of the catch pan 1300. For example, a length of the ribs 1316, 1318, or both may be smaller towards an inboard position (i.e., at a position near the center endless belt conveyor 1312) and increase in length towards the outboard end 1322. In other implementations, a length of the ribs 1316, 1318, or both may decrease from an inboard position to an outboard position. In some implementations, the set of ribs 1316 and the set of ribs 1318 may be aligned in the direction of arrow 1314. In other implementations, the set of ribs 1316 and the set of ribs 1318 may be offset from each other in the direction of arrow 1314.

Figure 14:
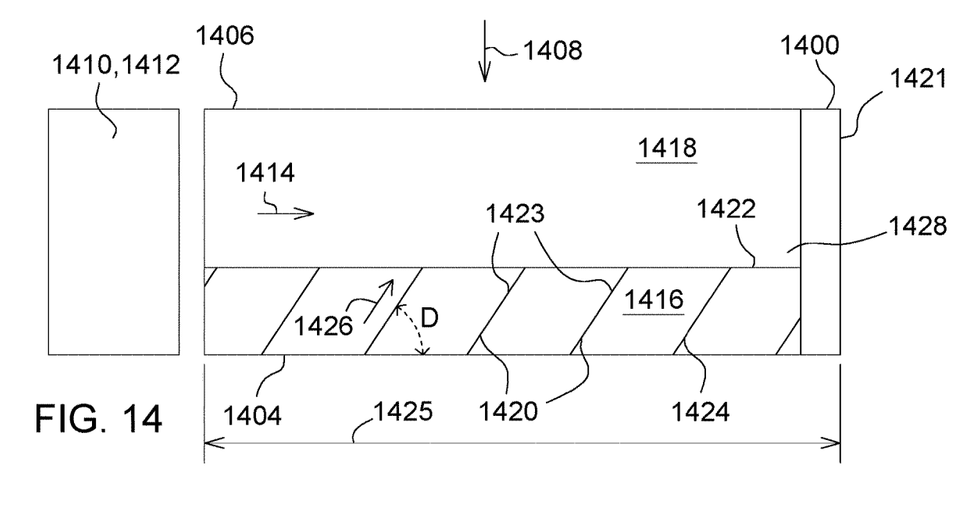
FIG. 14 is a top view of another example catch pan, according to some implementations of the present disclosure.

FIG. 14 shows another example catch pan 1400 that includes a collecting surface 1402 that collects crop material during a harvesting operation. The catch pan 1400 may have a position on a draper head similar to the catch pan 214, as shown in FIG. 2. Thus, the catch pan 1400 may be located adjacent to an endless belt conveyor 114 in a manner similar to the manner in which the catch pan 214 is positioned relative to the endless belt conveyor 114. The catch pan 1400 includes a leading edge 1404 and a trailing edge 1406. Arrow 1408 indicates a direction of travel of the catch pan 1400 (and associated draper head) during a crop harvesting operation. A location of an endless belt 1410 of a center endless belt conveyor 1412 is shown, schematically, adjacent to the catch pan 1400. Arrow 1414 indicates a direction of movement of a cleat of an adjacent endless belt of a lateral endless belt conveyor, which may be similar to lateral endless belt conveyor 114, relative to the collecting surface 1402 as well as a general direction of movement of collected crop material along the collecting surface 1402. Another catch pan similar to catch pan 1400 may be provided on a side of the endless belt conveyor 1412, opposite the catch pan 1400. Thus, the additional catch pan may have a position on a draper head similar to the catch pan 214 adjacent to the endless belt conveyor 116, as shown in FIG. 2. This additional catch pan may be configured to be a mirror image of the catch pan 1400 as reflected from the centerline of the endless belt conveyor 1412. Configurations of the catch pan 1400 and, thus, the additional catch pan, are described in more detail below.

The catch pan 1400 also includes a first portion 1416 that is parallel with a plane defined by a portion of an adjacent endless belt of a lateral endless belt conveyor and a second portion 1418 that is not parallel with such a plane of the adjacent endless belt. The first portion 1416 may be similar to the first portion 610 shown in FIG. 6, and the second portion 1418 may be similar to the second portion 612 also shown in FIG. 6. The first portion 1416 includes a plurality of ribs 1420 that extend from the leading edge 1404 to a boundary 1422 between the first portion 1416 and the second portion 1418. In some implementations, inboard ends of the ribs 1420 may be offset from the boundary 1422. In some implementations, the boundary 1422 corresponds to a bend in the catch pan 1400 formed between the first portion 1416 and the second portion 1418. Although two portions 1416 and 1418 are illustrated, the catch pan 1400 may include more than two portions. For example, in some implementations, the catch pan 1400 may have two or more portions parallel to the adjacent endless belt (or a plane defined by a portion of the adjacent endless belt) as well as one or more portions being nonparallel with the adjacent endless belt (or a plane defined by a portion of the adjacent endless belt).

As shown, a set of ribs 1420 extend across the first portion 1416 and define an angle D relative to the leading edge 1404. The ribs 1420 extend from the leading edge 1404 toward an outboard end 1421 of the catch pan 1400. The ribs 1420 may be similar to the ribs 1316 and 1318 described above. In some implementations, angle D may be within a range of 10° to 70°. For example, the angle D may be 10°, 15°, 20°, 25°, 30°, 35°, 40°, 45°, 50°, 55°, 60°, 65°, or 70°. In some implementations, the angle D may be less than 10°. In other implementations, the angle D may be greater than 70°. Further, in some implementations, the angle D may vary along a length 1425 of the catch pan 1400. For example, the angle D may have a smaller angle at an inboard position (i.e., at a position near the center endless belt conveyor 1412) and larger towards an outboard position (i.e., near the outboard end 1421). Alternatively, in other implementations, the angles D may decrease along the length 1425 of the catch pan 1400. Thus, the angle D may have a larger angle at a more inboard position and a smaller angle at a more outboard position.

In some implementations, one or more the ribs 1420 may be offset from the leading edge 1404 such that a gap is formed between the leading edge 1404 and an end 1424 of the ribs 1420. In the illustrated example, the ribs 1420 extend to the boundary 1422. In other implementations, an end 1423 of one or more of the ribs may be offset from the boundary 1422. In some implementations, the second portion 1418 may include one or more ribs extending between the trailing edge 1406 and boundary 1422. For example, ribs formed on the second portion 1418 may extend from or a location offset from the trailing edge 1406 and to the boundary 1422 or a location offset from the boundary 1422 in direction towards the outboard end 1421. An end of one or more of the ribs formed on the second portion 1418 at a location adjacent to the trailing edge 1406 may be offset from the trailing edge 1406, and one or more of the ribs formed on the second portion 1418 may extend to or be offset from the boundary 1422. Ribs formed on the second portion 1418 may be arranged ways similar to the ribs 1420 described above. Further, in some implementations, one or more of the ribs 1420 may be curved so as to define a curved path along a collecting surface of the catch pan 1400.

Cleats of an endless belt of a lateral endless belt conveyor adjacent to the collecting surface 1402 of the catch pan 1400 cooperate with the ribs 1420 to move the collected crop material in a direction of arrow 1426 towards a central portion 1428 of the collecting surface 1402. Similarly, cleats formed on an endless belt located adjacent to the collecting surface 1402 may cooperate with ribs formed on the second portion 1418 to transport collected crop material in a direction towards the outboard end 1421 and towards the central portion 1428.

FIGS. 13 and 14 show ribs, i.e., ribs 1316, 1318, and 1420, that are uniformly separated from adjacent ribs. That is, a distance between ribs is constant. However, the scope of the present disclosure is not so limited. Rather, in some implementations, a separation between adjacent ribs may be nonuniform. That is, a spacing separating adjacent ribs may vary along a length of the catch pan.

Figure 15:
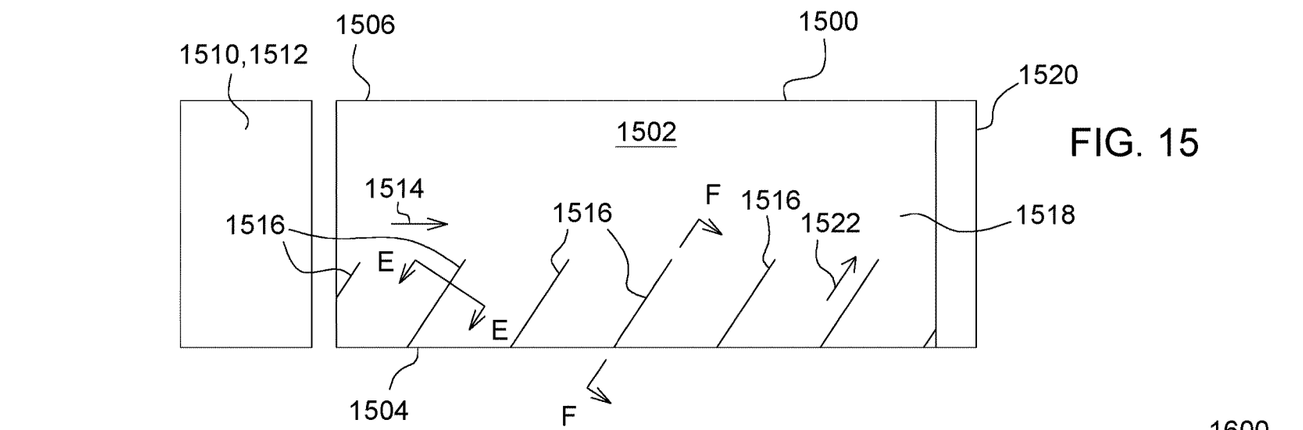
FIG. 15 is a top view of another example catch pan, according to some implementations of the present disclosure.

FIG. 15 shows another example catch pan 1500 that includes a collecting surface 1502 that collects crop material during a harvesting operation. The catch pan 1500 includes a leading edge 1504 and a trailing edge 1506. Arrow 1508 indicates a direction of travel of the catch pan 1500 (and associated draper head) during a crop harvesting operation. A location of an endless belt 1510 of a center endless belt conveyor 1512 is shown, schematically, adjacent to the catch pan 1500. Arrow 1514 indicates a direction of movement of a cleat of an adjacent endless belt of a lateral endless belt conveyor, which may be similar to lateral endless belt conveyor 114, relative to the collecting surface 1502 as well as a general direction of movement of collected crop material along the collecting surface 1502

The catch pan 1500 also includes a plurality of recesses 1516 formed therein. The recesses 1516 extend from or a location offset from the leading edge 1504 and towards a central portion 1518 of the catch pan 1500 and in a direction towards the outboard end 1520 of the catch pan 1500. Although not illustrated, in some implementations, one or more recesses may be formed in the catch pan 1500 and extend from or offset from the trailing edge 1506 towards the central portion 1518 in the direction of the outboard end 1520. In some implementations, one or more of the recesses 1516 may be curved so as to define a curved path along the collecting surface 1502 of the catch pan 1500.

Figure 16:
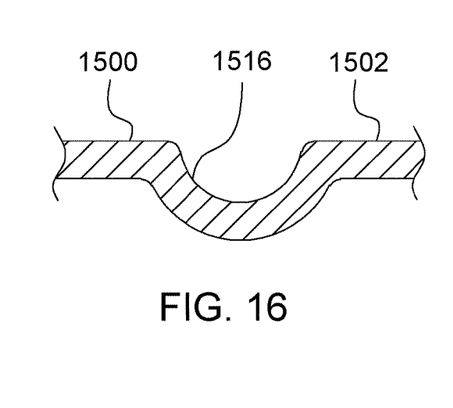
FIGS. 16 and 17 are cross-sectional views of example recesses formed into a catch pan, according to some implementations of the present disclosure.
Figure 17:
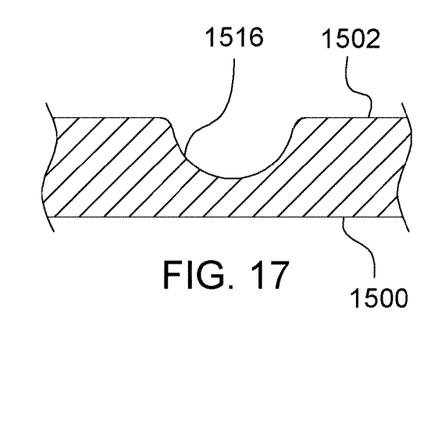

FIG. 16 is a cross-sectional view of a portion of the catch pan 1500 taken along line E-E in FIG. 15. FIG. 16 shows the recess 1516 formed as an indentation formed in the catch pan 1500. In other implementations, as shown in FIG. 17, the recess 1516 may be formed as a groove formed into the catch pan 1500, such as by a machining operation. Cleats of an endless belt of a lateral endless belt conveyor adjacent to the collecting surface 1502 of the catch pan 1500 cooperate with the recesses 1516 to move the collected crop material in a direction of arrow 1522 towards the leading edge 1504 of the catch pan 1500.

Figure 18:
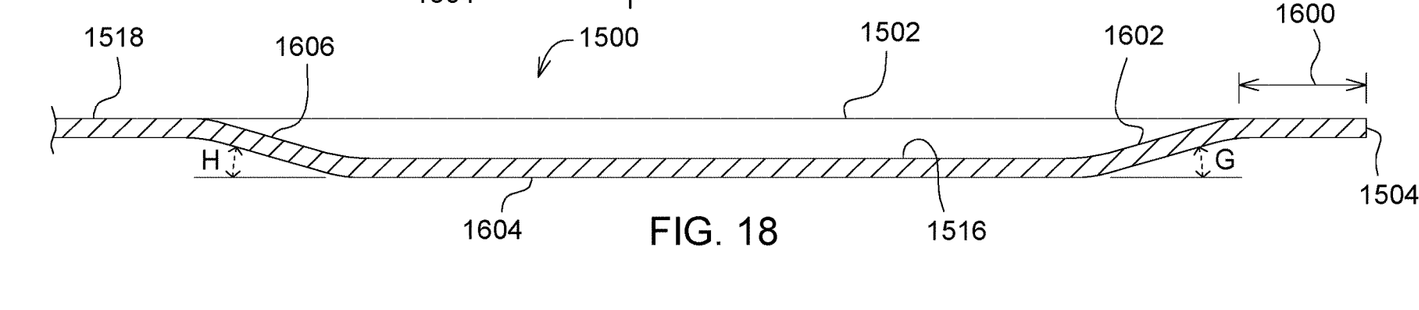
FIG. 18 s a cross-sectional view of a portion of the catch pan of FIG. 15 taken along line F-F.

FIG. 18 is a cross-sectional view of a portion of the catch pan 1500 taken along line F-F in FIG. 15. FIG. 18 shows a detail of a recess 1516. The recess 1516 is displaced from the leading edge 1504 by a gap 1600. In other implementations, the recess 1516 may extend to the leading edge 1504. The recess 1516 includes a first transitional sloping portion 1602, a constant depth portion 1604, and a second transitional sloping portion 1606. For a recess 1516 extending to the leading edge 1504, the sloping portion 1602 may extend from the leading edge 1504 to the constant depth portion 1604.

In some implementations, the first transitional sloping portion 1602 has a slope (measured by angle G relative to the constant depth portion 1604) that is less than a slope (measured by angle H relative to the constant depth portion 1604) of the second transitional sloping portion 1606. That is, in some implementations, the angle G is less than the angle H. In other implementations, the slopes of the first and second transitional sloping portion 1602 and 1606 may be the same. That is, in some implementations, the angle G and H are equal. In still other implementations, a slope of the second transitional sloping portion 1606 may be less than a slope of the first transitional sloping portion 1602. That is, in some implementations, the angle H is less than the angle G.

In the context of FIG. 15, the recesses 1516 operate to convey crop material collected on the collecting surface 1502 towards the central portion 1518 of the catch pan 1500 in the direction towards the outboard end 1520. With such an orientation, the recesses 1516 operate in combination with cleats of an adjacent endless belt to move the collected crop material in a direction of arrow 1522 towards the central portion 1518 of the collecting surface 1502.

Without in any way limiting the scope, interpretation, or application of the claims appearing below, a technical effect of one or more of the example implementations disclosed herein is to increase crop material collection and, hence, crop yield during crop harvesting. Other technical effects are clearly discernable to one skilled in the art in view of the present disclosure.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A draper head for a crop harvester, the draper head comprising:
   a frame;
   a first endless belt conveyor coupled to the frame, the first endless belt conveyor comprising:
      a first endless belt operable to circulate in a first direction, the first endless belt comprising:
         a first portion; and
         a second portion located adjacent to the first portion, the first portion and the second portion attached to each other to form a continuous strip; and
      at least one cleat located on the first endless belt and movable with the first endless belt;
   a second endless belt conveyor coupled to the frame, the first endless belt conveyor operable to deposit crop material onto the second endless belt conveyor; and
   a catch pan disposed adjacent to the second portion of the first endless belt and comprising:
      a planar portion extending along a length of the first endless belt;

a contoured portion located at an end of the planar portion, the contoured portion configured to follow a shape of the first endless belt, the catch pan offset from a surface of the second portion of the first endless belt and configured to collect crop material and, in cooperation with the at least one cleat, convey the collected crop material along at least a portion of the catch pan and deposit the collected crop material onto the first portion of the first endless belt; and at least one rib extending from the planar portion towards the first endless belt, the at least one rib extending across a surface of the planar portion and defining an oblique angle with respect to an edge of the catch pan.

2. The draper head of claim 1, wherein the first endless belt conveyor further comprises:
a first end;
a second end opposite the first end; and
a plurality of rollers,
wherein the first endless belt is operable to circulate around the plurality of rollers,
wherein the first endless belt conforms to a shape one of the rollers at the first end of the first endless belt conveyor, and
wherein the contoured portion of the catch pan is configured to follow the shape of the first endless belt at the first end of the first endless belt conveyor.

3. The draper head of claim 1, wherein the first endless belt defines a semicircular shape at a first end of the first endless belt conveyor, and wherein the contoured portion of the catch pan is configured to follow the semicircular shape along an angular range of 90° to 180° of the semicircular shape.

4. The draper head of claim 1, wherein the contoured portion of the catch pan extends along a portion of the first portion of the first endless belt and a portion of the second portion of the first endless belt.

5. The draper head of claim 1, wherein the at least on cleat extends from a surface of the first endless belt, and wherein a gap formed between an end of the at least one cleat and the catch pan is within a range of 0 millimeters (mm) to 11 mm.

6. The draper head of claim 1, wherein the planar portion extends along an entirety of a width of the first endless belt conveyor and is parallel with a plane defined by the second portion of the first endless belt.

7. The draper head of claim 1, wherein the planar portion comprises a first planar portion and a second planar portion angularly offset from the first planar portion.

8. The draper head of claim 7, wherein the first planar portion has an orientation that is parallel with a plane defined by the second portion of the first endless belt, and wherein the second planar portion is nonparallel with the plane defined by the second portion of the first endless belt.

9. The draper head of claim 1, wherein an end of the catch pan opposite the contoured portion is disposed within a gap formed between the first endless belt conveyor and the second endless belt conveyor.

10. A draper head for a crop harvester, the draper head comprising:
a frame extending laterally relative to a first direction in which the draper head is moved during a harvesting operation;
a first lateral endless belt conveyor coupled to the frame and extending laterally outwardly in a second direction perpendicular to the first direction, the first lateral endless belt conveyor comprising:
a plurality of rollers; and
a first endless belt arranged to encircle the plurality of rollers, the first endless belt comprising:
a first portion extending along a first side of the plurality of rollers;
a second portion extending along a second side of the plurality of rollers, the first portion and the second portion combined to form a continuous strip; and
at least one cleat extending from an outer surface of the first endless belt;
a catch pan disposed adjacent to the second portion of the first endless belt and comprising:
a planar portion;
a contoured portion, the contoured portion configured to follow a contour of the first endless belt at an outboard end of the first endless belt conveyor, the catch pan and the at least one cleat being configured to cooperate to convey crop material located on the catch pan between the catch pan and the second portion of the first endless belt and deposit the crop material onto the first portion of the first endless belt; and
a plurality of ribs extending towards the first endless belt, the plurality of ribs extending from a position adjacent to a first edge corresponding to the first side of the first endless belt conveyor towards the outboard end of the first endless belt conveyor;
a second lateral endless belt conveyor coupled to the frame and extending laterally outwardly in a third direction opposite the second direction; and
a central endless belt located between the first lateral endless belt conveyor and the second lateral endless belt conveyor, the central endless belt conveyor operable to receive crop material from the first endless belt conveyor and the second lateral endless belt conveyor.

11. The draper head of claim 10, wherein the endless belt defines a semicircular shape at the outboard end of the first endless belt conveyor and wherein the contoured portion of the catch pan extends between 90° and 180° around the semicircular shape.

12. The draper head of claim 10, wherein the catch pan defines a uniform gap between the catch pan and the endless belt for at least a portion of a width of the first endless belt.

13. The draper head of claim 10, wherein a first side of the first endless belt conveyor extending in the lateral direction is located at a first elevation that is less than a second elevation of a second side of the first endless belt conveyor opposite the first side.

14. The draper head of claim 13, wherein the catch pan further comprises at least one rib extending from a surface of the catch pan adjacent to the first endless belt, the at least one rib extending towards the first endless belt.

15. The draper head of claim 13, wherein a distance between the first side and the second side define a width of the first endless belt conveyor, and wherein the planar portion of the catch pan further comprises:
a first planar portion extending from the first side of the first endless belt conveyor along a first portion of the width of the first endless belt; and
a second planar portion extending at an angle from the first planar portion along a second portion of the width of the first endless belt conveyor, the second endless portion diverging from the first endless belt along the second portion of the width of the first endless belt conveyor.

16. The draper head of claim 15, wherein the first planar portion is oriented parallel to a plane defined by the second portion of the first endless belt, and wherein the first planar portion and the second portion of the first endless belt define a uniform gap formed between the first planar portion and the second portion of the first endless belt.

17. The draper head of claim 10, wherein an inboard end of the first lateral endless belt conveyor overlaps a portion of the central endless belt conveyor to define a gap, and wherein an inboard end of the catch pan is located within the gap.

* * * * *